United States Patent
Nakano et al.

(10) Patent No.: US 9,783,691 B2
(45) Date of Patent: Oct. 10, 2017

(54) INK SET AND RECORDING METHOD

(71) Applicant: Seiko Epson Corporation, Tokyo (JP)

(72) Inventors: Tomohito Nakano, Shiojiri (JP); Yusuke Mizutaki, Shiojiri (JP); Toru Miyamoto, Shiojiri (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/211,260

(22) Filed: Jul. 15, 2016

(65) Prior Publication Data

US 2017/0037272 A1 Feb. 9, 2017

(30) Foreign Application Priority Data

Aug. 6, 2015 (JP) .................................. 2015-155869

(51) Int. Cl.
| | |
|---|---|
| *C09D 11/40* | (2014.01) |
| *C09D 11/107* | (2014.01) |
| *C09D 11/324* | (2014.01) |
| *C09D 11/106* | (2014.01) |

(52) U.S. Cl.
CPC .......... *C09D 11/107* (2013.01); *C09D 11/106* (2013.01); *C09D 11/324* (2013.01); *C09D 11/40* (2013.01)

(58) Field of Classification Search
CPC ..... C09D 11/54; C09D 11/037; C09D 11/107; C09D 11/38; C09D 11/324; C09D 11/106; C09D 11/40; C09D 11/023
See application file for complete search history.

(56) References Cited

U.S. PATENT DOCUMENTS 7,513,944 B2 * 4/2009 Sano .................... C09D 11/326
106/31.13

FOREIGN PATENT DOCUMENTS

| JP | 2004-225036 A | 8/2004 |
|---|---|---|
| JP | 2010-132909 A | 6/2010 |

* cited by examiner

*Primary Examiner* — Manish S Shah
*Assistant Examiner* — Yaovi M Ameh
(74) *Attorney, Agent, or Firm* — Harness, Dickey & Pierce, P.L.C.

(57) ABSTRACT

An ink set includes a first black ink which includes water, less than 0.3 mass % of carbon black, and a resin, in which a solid content in the ink is 20 times or more a content of the carbon black; a second black ink which includes water, 0.3 mass % or more and less than 0.6 mass % of carbon black, and a resin, in which a solid content in the ink is 10 times or more a content of the carbon black; a third black ink which includes water, 0.6 mass % or more and less than 1.5 mass % of carbon black, and a resin, in which a solid content in the ink is twice or more a content of the carbon black; and a fourth black ink which includes water, 1.5 mass % to 10 mass % of carbon black, and a resin.

14 Claims, 1 Drawing Sheet

INK SET AND RECORDING METHOD

BACKGROUND

1. Technical Field

The present invention relates to an ink set and a recording method using the ink set.

2. Related Art

As ink sets for ink jet recording, three color ink sets which are provided with yellow (Y), magenta (M), and cyan (C) inks, or four color ink sets to which black (K) ink is further added have been provided. In addition, for the purpose of obtaining a favorable black and white monochrome image or gray scale, or in order to respond to a demand for higher quality in achromatic color portions (black, gray, and white portions) of a color image, an ink set which includes two types or three or more types of black inks with different carbon black concentrations may be used.

When carrying out recording using an ink set which includes a plurality of types of black inks with different carbon black concentrations, the color reproducibility of the darkest gradation region or the gradation of gray is improved. On the other hand, in a bright gradation region, that is, in a region where recording is carried out using an ink with a lower carbon black concentration, since a lot of ink is used in order to adjust the ink generation amount, not only is the graininess poor, but also a phenomenon which is called "bronzing" is generated in which colors appear to change by reflecting as rainbow colors depending on the viewing angle or the light source environment. When bronzing is generated, the surface of the recorded matter is seen with a different tone from a state of normal diffusion and reflection and appears to have a metallic luster. For this reason, in recorded matter where bronzing is generated, the tone may change and appear unnatural depending on the relative positional relationship with the viewer. Thus, bronzing is not a preferable phenomenon and is desirably removed.

Therefore, using an ink set which uses a plurality of black ink compositions where the content of carbon black is adjusted, there have been attempts to improve the graininess of a bright gradation region and to remove bronzing (for example, refer to JP-A-2010-132909).

However, even using the technique described above, the improvement of the graininess and the removal of the bronzing are not sufficient.

SUMMARY

An advantage of some aspects of the invention is to provide an ink set and a recording method using the ink set, with which a favorable image where the graininess is reduced even in bright gradation regions and bronzing is improved is obtained by solving at least part of the problem described above.

The invention can be realized in the following aspects or application examples.

Application Example 1

According to an aspect of the invention, there is provided an ink set including a first black ink composition which includes water, less than 0.3 mass % of carbon black, and an emulsion of a resin component, in which a solid content of the emulsion in the ink composition is 20 times or more a content of the carbon black; a second black ink composition which includes water, 0.3 mass % or more and less than 0.6 mass % of carbon black, and an emulsion of a resin component, in which a solid content of the emulsion in the ink composition is 10 times or more a content of the carbon black; a third black ink composition which includes water, 0.6 mass % or more and less than 1.5 mass % of carbon black, and an emulsion of a resin component, in which a solid content of the emulsion in the ink composition is twice or more a content of the carbon black; and a fourth black ink composition which includes water, 1.5 mass % to 10 mass % of carbon black, and an emulsion of a resin component.

According to the aspect of Application Example 1, it is possible to provide an ink set with which a favorable image where the graininess is reduced even in a bright gradation region and bronzing is improved is obtained by using four types of black ink compositions which form the ink set and further adjusting the solid content and the carbon black content in each ink composition.

Application Example 2

In the ink set according to Application Example 1, the emulsion of the resin component which includes the first black ink composition to the fourth black ink composition may include a copolymer with an acid value of 40 or less obtained by polymerizing a polyalkylene-type emulsion and/or ethylenically unsaturated carboxylic acid monomers, and other monomers copolymerizable therewith, in a presence of an alcoholic hydroxyl group-containing water-soluble polymer compound or a copolymerizable surfactant, and an emulsion in which a pH adjusted resin of which the pH was adjusted with an inorganic salt is set as resin component.

Application Example 3

In the ink set according to Application Example 2, an inorganic base which is used for the adjustment of the pH adjusted resin may be an alkali metal hydroxide or an alkaline earth hydroxide.

Application Example 4

In the ink set according to Application Example 2 or 3, the ethylenically unsaturated carboxylic acid monomer which is used for the adjustment of the pH adjusted resin may be acrylic acid or methacrylic acid.

Application Example 5

In the ink set according to any one of Application Examples 2 to 4, a monomer copolymerizable with the ethylenically unsaturated carboxylic acid monomer which is used for the adjustment of the pH adjusted resin may be an ethylenically unsaturated carboxylic acid ester monomer.

Application Example 6

In the ink set according to any one of Application Examples 2 to 5, a pH of the emulsion in which the pH adjusted resin is a resin component may be 8 to 11.

Application Example 7

The ink set according to any one of Application Examples 2 to 6, the polyalkylene-type emulsion may be a polyethylene-type emulsion or a polypropylene-type emulsion.

Application Example 8

According to another aspect of the invention, there is provided a recording method for performing recording by discharging droplets of an ink composition and attaching the droplets to a recording medium, the method including: using the ink set according to any one of Application Examples 1 to 7 is used.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
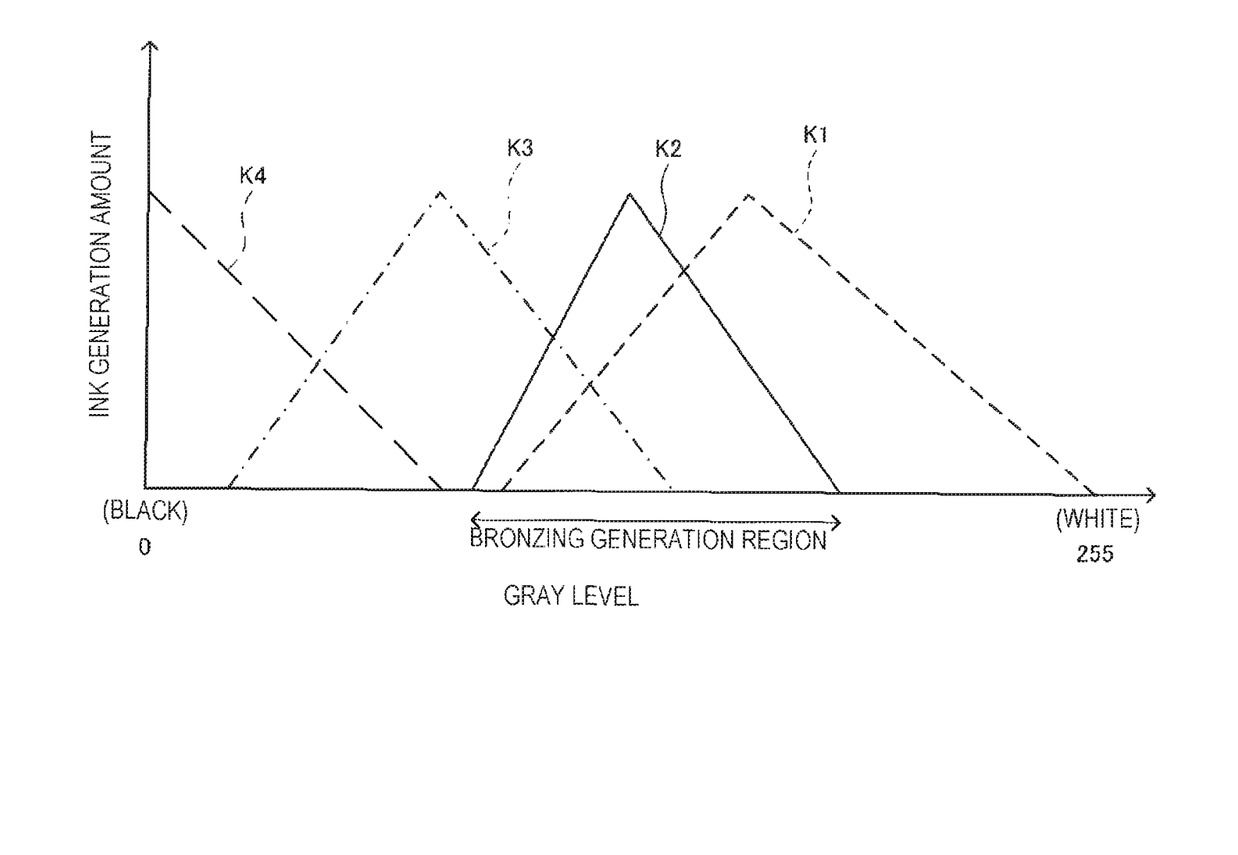
FIGURE is a graph which schematically shows a relationship between colors and an ink generation amount in a case of printing a gray scale using four types of black ink compositions.

Description will be given below of favorable embodiments of the invention. The embodiments described below describe an example of the invention. In addition, the invention is not limited to the embodiments below and also includes various types of modified examples which are carried out in a range which does not change the gist of the invention.

1. Ink Set ( First to Fourth Black Ink Compositions)

An ink set according to the present embodiment is formed by first to fourth black ink compositions with different carbon black concentrations. The first to fourth black ink compositions each include water, carbon black as a coloring material, and an emulsion of a resin component. The emulsion of a resin component contained by the first to fourth black ink compositions is a water-based dispersing liquid where the dispersing medium is water and the dispersoid is polymer fine particles. The first to fourth black ink compositions mainly differ in the content of carbon black which is used as a coloring material.

That is, the ink set according to the present embodiment has a first black ink composition which includes water, less than 0.3 mass % of carbon black, and an emulsion of a resin component, in which a solid content of the emulsion in the ink composition is 20 times or more the content of the carbon black; a second black ink composition which includes water, 0.3 mass % or more and less than 0.6 mass % of carbon black, and an emulsion of a resin component, in which a solid content of the emulsion in the ink composition is 10 times or more the content of the carbon black, a third black ink composition which includes water, 0.6 mass % or more and less than 1.5 mass % of carbon black, and an emulsion of a resin component, in which a solid content of the emulsion in the ink composition is twice or more the content of the carbon black, and a fourth black ink composition which includes water, 1.5 mass % to 10 mass % of carbon black, and an emulsion of a resin component.

FIGURE schematically shows a relationship between colors and an ink generation amount in a case of printing a gray scale using four types of black ink composition which form the ink set according to the present embodiment. As shown in FIGURE, in the present embodiment, a gray scale from black to white is appropriately produced by changing the usage ratio of the first to fourth black ink compositions (K1 to K4) with different carbon black concentrations, and it is possible to obtain a favorable image where the graininess is reduced even in a bright gradation region and bronzing is improved by carrying out the recording using the four types of black ink compositions.

Here, the bronzing described above is generated in a region where recording is carried out with ink with a low carbon black concentration. In a case where gray level 0 is absolute black and gray level 255 is absolute white, the bronzing generation region reaches regions of approximately to approximately 160 centering on regions with a gray level of approximately 100 to approximately 140. In addition, the brightness range of the bronzing generation region reaches a region of approximately 40 to approximately with approximately 50 to approximately 60 being the center region. As shown in FIGURE, in the ink set according to the present embodiment, in a case of recording a black and white monochrome image, the bronzing generation region is recorded using at least two types of black ink compositions.

Description will be given below of the first to fourth black ink compositions (also referred to below as inks) which form the ink set according to the present embodiment, components which are included in the black ink compositions, and components which may be included.

1.1. Carbon Black

It is possible to use carbon black which is produced according to methods known in the art such as a contact method, a furnace method, and a thermal method in addition to titanium oxide and iron oxide as carbon black which is used as a coloring material (also called a pigment or a coloring agent).

As commercially available products of the carbon black, it is possible to use, for example, No. 2300, No. 900, HCF88, No. 33, No. 40, No. 45, No. 52, MA7, MA8, MA100, No2200B, or the like produced by MITSUBISHI CHEMICAL CORP., RAVEN 5750, RAVEN 5250, RAVEN 5000, RAVEN 3500, RAVEN 1255, RAVEN 700, or the like produced by COLOMBIAN CHEMICALS COMPANY, REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, MONARCH 1400, or the like produced by Cabot Corp., and COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK 170, PRINTEX 35, PRINTEX U, PRINTEX V, PRINTEX 140U, SPECIAL BLACK 6, SPECIAL BLACK 5, SPECIAL BLACK 4A, SPECIAL BLACK 4, or the like produced by Evonik Japan, but the invention is not limited thereto.

In addition, in the invention, it is possible to use carbon black on which an oxidizing treatment is carried out on the surface along with a pH adjusted resin which will be described below. In a case of using carbon black on which an oxidizing treatment is carried out on the surface, it is possible to add the carbon black to the ink composition as a pigment dispersing liquid where the carbon black is dispersed in an aqueous medium without using the dispersing agent which will be described below. It is possible to carry out the carbon black oxidizing treatment using a method known in the art. Through the oxidizing treatment, it is possible to introduce a hydrophilic group such as a carbonyl group, a carboxyl group, a hydroxyl group, and a sulfone group on the surface of the carbon black.

The carbon black may be used as one type individually or may be used in a combination of two or more types. In addition, in the ink set according to the present embodiment, it is possible for each carbon black contained by each of the black ink compositions to be the same or different.

The average particle diameter of the carbon black is not particularly limited; however, 10 µm or less is preferable, 0.1 µm or less is more preferable, and 50 nm to 500 nm is even more preferable. When the average particle diameter is 50 nm or more, it is easy to use as an ink since the coloring property is more favorable. On the other hand, when the average particle diameter is 500 nm or less, it is easy to use in an ink jet method. In addition, the average particle diameter described above is more preferably 50 nm to 300 nm and even more preferably 50 nm to 200 nm since the storage stability, discharge stability, and precipitation of ink are excellent.

Here, the "average particle diameter" in the present specification refers to an equivalent spherical 50% average particle diameter (d50) which is obtained by a light scattering method. The "equivalent spherical 50% average particle diameter (d50) which is obtained by a light scattering method" is a value which is obtained as below. The particles in the dispersing medium are irradiated with light and the generated diffraction scattering light is measured by detectors which are disposed at the front, side, and rear of the dispersing medium. Using the measurement values, assuming particles which actually have irregular shapes have a spherical shape, a cumulative curve is obtained with a total volume of the particle group converted into spheres, which is equivalent to the volume of the particles, as 100%, and a point where the accumulated value at that time is 50% is set as the 50% average particle diameter (d50) described above.

In the first to fourth black ink compositions which form the ink set according to the present embodiment, the content of each carbon black is different.

In the first black ink composition which is used in the brightest gradation portion, the content of the carbon black is less than 0.3 mass % with respect to the total mass (100 mass %) of the first black ink composition, preferably 0.01 mass % to 0.28 mass %, and more preferably 0.05 mass % to 0.25 mass %.

In the second black ink composition which is used in the second brightest gradation portion, the content of the carbon black is 0.3 mass % or more and less than 0.6 mass % with respect to the total mass of the second black ink composition, preferably 0.32 mass % to 0.55 mass %, and more preferably 0.35 mass % to 0.5 mass %.

In the third black ink composition which is used in the intermediate gradation portion, the content of the carbon black is 0.6 mass % or more and less than 1.5 mass % with respect to the total mass of the third black ink composition, preferably 0.7 mass % to 1.2 mass %, and more preferably 0.8 mass % to 1.0 mass %.

In the fourth black ink composition which is used in the darkest gradation portion, the content of the carbon black is 1.5 mass % to 10 mass % with respect to the total mass of the fourth black ink composition, preferably 2.0 mass % to 9.0 mass %, and more preferably 2.5 mass % to 8.0 mass %.

In a case where a black and white monochrome image is recorded using the ink set according to the present embodiment, the bronzing generation region shown in FIGURE is recorded using at least two types of black ink compositions with different carbon black amounts, that is, at least two types of black ink compositions out of the first to third black ink compositions (K1 to K3). For this reason, when using the ink set according to the present embodiment, it is possible to appropriately adjust the ink generation amount and the gradation property is improved by suppressing graininess and it is possible to realize smooth monochrome gradation expression.

1.2. Water

The first to fourth black ink compositions which form the ink set according to the present embodiment contain water as a dispersing medium which disperses carbon black or fine particles of resin components which will be described below. Examples of the water include pure water such as ion-exchanged water, ultrafiltration water, reverse osmosis water, and distilled water or water such as ultra-pure water where ionic impurities are removed as much as possible. In addition, when using water sterilized by ultraviolet irradiation, addition of hydrogen peroxide, and the like, it is possible to prevent the generation of mold or bacteria in a case of storing the ink for long periods, which is favorable.

The content of the water of the first to fourth black ink compositions which form the ink set according to the present embodiment is preferably 40 mass % or more with respect to the total mass (100 mass %) of each ink, more preferably 45 mass % or more, and even more preferably 50 mass % or more. Here, the water content is not limited to the amount of the added water and also includes moisture in the additive agents in a case of adding other additive agents and the like.

1.3. Resin Component

The first to fourth black ink compositions which form the ink set according to the present embodiment include emulsions of a resin component. The emulsion of a resin component is a water-based dispersing liquid where fine particles of the resin components are dispersed in water which is a dispersing medium.

The minimum film-forming temperature (MFT) of the polymer fine particles which are included in the emulsion of a resin component is not particularly limited; however, 25° C. or less is preferable, 0° C. to 25° C. is more preferable, and 10° C. to 20° C. is even more preferable. The MFT is measured according to JIS K 6800. By carrying out printing on a recording medium using a black ink composition which contains emulsion within the MFT ranges, a protective film which covers the printing surface is automatically formed at room temperature.

The glass transition temperature (Tg) of the polymer fine particles which are contained in the fine particle emulsion is preferably −15° C. to 10° C., and more preferably −5° C. to 5° C. from the point of view of adjusting MFT of the emulsion within the ranges. The Tg is measured according to JIS K 6900.

Examples of the other methods for adjusting MFT of the emulsion within the ranges described above include methods of using a commercially available MFT depressant.

In the ink set according to the present embodiment, the solid content concentration of the fine particle emulsion in the first black ink composition is able to be an arbitrary concentration as long as the concentration is 20 times or more the carbon black concentration, but is 0.2 mass % to 20 mass % with respect to the total mass of the first black ink composition, preferably 0.5 mass % to 15 mass %, and more preferably 1 mass % to 10 mass %. In addition, the solid content of the fine particle emulsion is 20 times or more the content of the carbon black and the upper limit thereof is not particularly limited; however, when the solid content of the fine particle emulsion exceeds 40 times the content of the carbon black, there are cases of having discharge defects. On the other hand, it is not possible to sufficiently suppress bronzing when the content of the fine particle emulsion is less than 20 times the content of the carbon black.

In the ink set according to the present embodiment, the solid content concentration of the fine particle emulsion in the second black ink composition is able to be an arbitrary concentration as long as the solid content concentration is 10 times or more the carbon black concentration; however, the solid content concentration is 0.2 mass % to 20 mass % with respect to the total mass of the second black ink composition, preferably 0.5 mass % to 15 mass %, and more preferably 2.5 mass % to 10 mass %. In addition, the solid content of the fine particle emulsion is times or more the content of the carbon black and the upper limit thereof is not particularly limited; however, when the solid content of the fine particle emulsion exceeds 25 times the content of the carbon black, there are cases of discharge defects. On the other hand, when the content of the fine particle emulsion is less than 10 times the content of the carbon black, it is not possible to sufficiently suppress bronzing.

In the ink set according to the present embodiment, the solid content concentration of the fine particle emulsion in the third black ink composition is able to be an arbitrary concentration as long as the solid content concentration is 2 times or more the carbon black concentration; however, the solid content concentration is 0.8 mass % to 10 mass % with respect to the total mass of the third black ink composition, preferably 1 mass % to 8 mass %, and more preferably 1.5 mass % to 5 mass %. In addition, the solid content of the fine particle emulsion is 2 times or more the content of the carbon black and the upper limit thereof is not particularly limited; however, when the solid content exceeds 10 times the content of the carbon black, there are cases of discharge defects. On the other hand, it is not possible to sufficiently suppress bronzing when the content of the fine particle emulsion is less than 2 times the content of the carbon black.

In the ink set according to the present embodiment, the solid content concentration of the fine particle emulsion in the fourth black ink composition is not particularly limited; however, the solid content concentration is 0.5 mass % to 10 mass % with respect to the total mass of the fourth black ink composition, preferably 0.7 mass % to 8 mass %, and more preferably 0.8 mass % to 5 mass %. In addition, the upper limit of the solid content of the fine particle emulsion is not particularly limited; however, when the solid content exceeds 2 times or more the content of the carbon black, there are cases of discharge defects. In addition, when the solid content is less than the content of the carbon black, the fastness of the carbon black to a recording medium may deteriorate.

Regarding the polymer fine particles, from the point of view of the dispersion stability in the ink composition, the average particle diameter thereof is preferably 5 nm to 200 nm, and more preferably 5 nm to 100 nm.

In addition, the polymer fine particles preferably have a hydrophilic portion and a hydrophobic portion. In addition, the structure of the polymer fine particles may be either a single phase structure, a multi-phase structure (a core shell structure), or the like. It is sufficient if the core shell structure is a structure where two or more different types of polymers are separated from each other to be present and may be, for example, a structure where a shell portion completely covers a core portion, a structure where a shell portion partially covers a core portion, a structure where a part of a shell portion polymer forms a domain or the like in a core portion polymer, or a multilayer structure with three or more layers which further includes one or more layers with different compositions between a core portion and a shell portion.

In a case of using particles with the core shell structure as the polymer fine particles, polymer fine particles where a core portion is formed of polymers which have an epoxy group and a shell portion formed of polymers which have a carboxyl group, are preferable. By making the ink composition contain the polymer fine particles, it is possible to improve the strength of the protective film since a network structure is formed by bonding the epoxy group of the core portion and the carboxyl group of the shell portion at the time of forming the protective film.

In addition, the polymer fine particles preferably have 1 mass % to 10 mass % of a structure which is derived from an unsaturated vinyl monomer which has a carboxyl group and 0.2 mass % to 4 mass % of a structure (a structure which is derived from a cross-linking monomer) which is cross-linked by a cross-linking monomer which has, preferably two or more, and more preferably three or more polymerizable double bonds. By making the ink composition contain the polymer fine particles, it is possible to prevent flight curvature of the ink droplets since the ink does not easily wet a nozzle plate surface and it is possible to further improve the discharge stability.

Examples of unsaturated vinyl monomers which have a carboxyl group include acrylic acid, methacrylic acid, itaconic acid, fumaric acid, maleic acid, and the like, and methacrylic acid is particularly preferable.

Examples of cross-linking monomers include diacrylate compounds such as polyethylene glycol acrylate, triethylene glycol diacrylate, 1,3-butylene glycol diacrylate, 1,6-butylene glycol diacrylate, 1,6-hexane diol diacrylate, neopentyl glycol diacrylate, 1,9-nonane diol diacrylate, polypropylene glycol diacrylate, 2,2'-bis (4-acryloxypropyloxyphenyl) propane, 2,2-bis (4-acryloxydiethoxyphenyl) propane; triacrylate compounds such as trimethylol propane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis (4-methacryloxy diethoxyphenyl) propane; trimethacrylate compounds such as trimethylol propane methacrylate, and trimethylolethane trimethacrylate; and methylene bisacrylamide, divinylbenzene, and the like.

The polymer fine particles are contained in the first to fourth black ink compositions which form the ink set according to the present embodiment as the emulsion; however, it is possible to produce the emulsion by emulsion polymerization known in the art. For example, the emulsion of the polymer fine particles is produced by carrying out emulsion polymerization on an unsaturated vinyl monomer in water in the presence of a surfactant (an emulsifying agent), a polymerization catalyst, a polymerization initiator, a molecular weight adjusting agent, a neutralizer, and the like.

Examples of the unsaturated vinyl monomer (the monomer which configures the polymer fine particles) include acrylic acid ester monomers, methacrylic acid ester monomers, aromatic vinyl monomers, vinyl ester monomers, vinyl cyan compound monomers, halogenated monomers, olefin monomers, diene monomers, and the like, which are generally used in emulsion polymerization. Specifically, examples include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters such as vinyl acetate; vinyl cyan compounds such as acrylonitrile; halogenated monomers such as vinylidene chloride, and vinyl chloride; aromatic vinyl monomers such as styrene, 2-methyl styrene vinyl toluene, tert-butyl styrene, chlorostyrene, vinylanisole, and vinyl naphthalene; olefins such as ethylene, propylene, and isopropylene; dienes such as butadiene, and chloroprene; vinyl monomers such as vinyl ether, vinyl ketone, and vinyl pyrrolidone.

Examples of the surfactant which is used in emulsion polymerization include anionic surfactants (dodecylbenzene sodium sulfonate, lauryl acid sodium, ammonium salt of polyoxyethylene alkyl ether sulfate, and the like) and nonionic surfactants (polyoxyethylene alkyl ether, polyoxyethylene alkyl ester, polyoxyethylene sorbitan fatty acid ester, polyoxyethylene alkyl phenyl ether, polyoxyethylene alkyl amine, polyoxyethylene alkyl amide, and the like) and it is possible to use one type or two or more types thereof. In addition, it is also possible to use acetylene glycol [OLEFIN Y and SURFYNOL 82, 104, 440, 465, and 485 (all produced by Air Products and Chemicals, Inc.)].

When producing the emulsion (the polymer fine particles), from the point of view of improving the printing stability, one type or two or more types selected from a group consisting of acrylamides and hydroxyl group-containing monomers are preferably blended in addition to the unsaturated vinyl monomer at the time of the emulsion polymerization. Examples of acrylamides include acrylamide, N,N'-dimethyl acrylamide, and the like and it is possible to use one type or two or more types thereof at the time of usage. In addition, examples of the hydroxyl group-containing monomers include 2-hydroxy ethyl acrylate, 2-hydroxy ethyl methacrylate, 2-hydroxy propyl methacrylate, and the like and it is possible to use one type or two or more types thereof.

In addition, in a case of using particles with a core shell structure as the polymer fine particles, it is possible to produce an emulsion which contains the polymer fine particles by, for example, the method (emulsion polymerization of an unsaturated vinyl monomer in a plurality of stages) which is disclosed in JP-A-4-76004 and the like.

Here, as described above, the polymer fine particles with a core shell structure are preferably formed of polymers of which a core portion has an epoxy group and examples of a method for introducing an epoxy group to a core portion include a method for copolymerizing glycidyl acrylate, glycidyl methacrylate, allyl glycidyl ether, and the like which have epoxy groups with other unsaturated vinyl monomers, a method of simultaneously adding epoxy compounds when preparing a core portion (core particles) by polymerizing one or more types of unsaturated vinyl monomers and forming a complex therewith, or the like. In particular, the former method is preferable in terms of the ease of polymerization, polymerization stability, and the like.

As the resin component of the fine particle emulsion, it is possible to use, for example, a pH adjusted resin which is produced by adjusting the pH of a copolymer (referred to below as an "alkali-soluble copolymer") with an acid value of 40 or less which is obtained by polymerizing ethylenically unsaturated carboxylic acid monomers and other monomers which are able to be copolymerized therewith in the presence of an alcoholic hydroxyl group-containing water-soluble polymer compound or a copolymerizable surfactant using an inorganic base.

In the first to fourth black ink compositions which form the ink set according to the present embodiment, the content of the pH adjusted resin is able to be 0.01 mass % to 10 mass % with respect to the total mass of each of the black ink compositions, is preferably 0.5 mass % to 5 mass %, and more preferably 1 mass % to 3 mass %. Here, when the pH adjusted resin content is 5 mass % or more, while there is an effect of suppressing the generation of bronzing, there are times when the tone of the printed matter changes directly after printing.

The alcoholic hydroxyl group-containing water-soluble polymer compound which is used when producing the alkali-soluble copolymer refers to, for example, a compound which contains 5 to 25 alcoholic hydroxyl groups per unit of 1,000 molecular weight from among water-soluble polymer compounds, and examples thereof include vinyl alcohol-based polymers such as polyvinyl alcohol and various types of modified products thereof; saponified products of copolymers of vinyl acetate and acrylic acid, methacrylic acid, or maleic anhydride; cellulose derivatives such as alkyl cellulose, hydroxy alkyl cellulose, and alkyl hydroxy alkyl cellulose; starch derivatives such as alkyl starch, carboxyl methyl starch, and starch oxide; gum arabic and gum tragacanth; polyalkylene glycol, and the like. Among these, vinyl alcohol-based polymers are preferable in terms of the ease of obtaining an alcoholic hydroxyl group-containing water-soluble polymer compound with stable quality on an industrial scale.

The mass average molecular weight of the alcoholic hydroxyl group-containing water-soluble polymer compound is not particularly limited, but is generally 1,000 to 500,000, and preferably 2,000 to 300,000. The dispersion stability effect may be low when the molecular weight is smaller than 1,000 and, in contrast, the viscosity may be high when polymerizing in the presence of the polymer compound and polymerization may be difficult when the molecular weight is larger than 500,000.

The amount of the alcoholic hydroxyl group-containing water-soluble polymer compound which is used for producing an alkali-soluble copolymer is generally 0.05 parts by mass to 20 parts by mass with respect to 100 parts by mass of the monomer, and preferably 1 part by mass to 10 parts by mass. Since the dispersion stability effect is low when the amount is less than 0.05 parts by mass, aggregates are generated at the time of polymerization, and, in contrast, when the amount is more than 20 parts by mass, the viscosity at the time of polymerization may be high and polymerization may be difficult.

Here, when producing the alkali-soluble copolymer, a surfactant which is generally used in emulsion polymerization is preferably not used therewith; however, in a case of using a surfactant therewith, the amount of the surfactant is generally less than 0.05 parts by mass with respect to the 100 parts by mass of the total amount of monomers which are used for synthesizing the alkali-soluble copolymers. When the amount of the surfactant is large, there is a tendency for the obtained image to have poor water resistance.

The ethylenically unsaturated carboxylic acid monomer which is used when producing the alkali-soluble copolymer is not particularly limited and examples thereof include ethylenically unsaturated monocarboxylic acid monomers such as acrylic acid and methacrylic acid; ethylenically unsaturated multivalent carboxylic acid monomers such as itaconic acid, maleic acid, fumaric acid, and butene tricarboxylic acid; partial ester monomers of ethylenically unsaturated multivalent carboxylic acid such as fumaric acid monobutyl, maleic acid monobutyl, and maleic acid mono-2-hydroxy propyl; multivalent carboxylic acid anhydrides such as maleic anhydride and citraconic anhydride; and the like. It is possible to use the monomers individually or in a combination of two or more types. Among the ethylenically unsaturated acid monomers, an ethylenically unsaturated monocarboxylic acid such as (meth)acrylic acid is preferable, and methacrylic acid is more preferable.

The usage amount of the ethylenically unsaturated carboxylic acid monomer is an amount which is calculated such that the acid value of the alkali-soluble copolymer is 40 or less, preferably 10 to 40 or less, and more preferably 30 to 40 or less. When the acid value of the alkali-soluble copolymer exceeds 40 or is less than 10 when converting the amount, the quality of the obtained image may be poor.

The ethylenically unsaturated carboxylic acid monomer and the other monomers which can be copolymerized therewith, which can be used for the production of the alkali-soluble copolymer are not particularly limited, but examples thereof include aromatic vinyl monomers such as styrene, α-methyl styrene, vinyl toluene, and chlorostyrene; ethylenically unsaturated carboxylic acid ester monomers such as methyl (meth)acrylic acid, ethyl (meth)acrylic acid, propyl (meth)acrylic acid, butyl (meth)acrylic acid, isobutyl (meth) acrylic acid, amyl-n-(meth)acrylic acid, isoamyl (meth) acrylic acid, hexyl-n-(meth)acrylic acid, ethylhexyl-2-(meth)acrylic acid, octyl (meth)-n-acrylic acid, hydroxyethyl-2-(meth)acrylic acid, hydroxypropyl (meth) acrylic acid, and glycidyl (meth)acrylic acid; ethylenically unsaturated nitrile monomers such as (meth)acrylonitrile; ethylenically unsaturated glycidyl ether monomers such as allyl glycidyl ether; ethylenically unsaturated amide monomers such as (meth)acrylamide, N-methylol (meth)acrylamide, N-butoxymethyl (meth)acrylamide, and the like; conjugated diene monomers such as 1,3-butadiene, isoprene, 2,3-dimethyl-1,3-butadiene, and 1,3-pentadiene; carboxylic acid vinyl esters such as vinyl acetate and the like. It is possible to use these monomers individually or in a combination of two or more types. Among these, in terms of being excellent in the light resistance and glossiness of the obtained image, ethylenically unsaturated carboxylic acid ester monomers are preferable, and methacrylic acid methyl and acrylic acid ethyl are more preferable.

It is possible to obtain the alkali-soluble copolymer by polymerizing a mixture of the monomers described above, preferably in a water medium, in the presence of an alcoholic hydroxyl group-containing water-soluble polymer compound. At this time, it is possible to add all of the alcoholic hydroxyl group-containing water-soluble polymer compound and the mixture of the monomers into a reaction container in a batch before initiating polymerization, to insert a portion before initiating the polymerization and add the remaining portions little by little separately, or to add the remaining portions continuously after initiating polymerization. In a case of adding the portions separately or continuously, it is also possible to keep the added amounts equal or constant and it is also possible to change the amounts according to the proceeding phase of the polymerization.

The alcoholic hydroxyl group-containing water-soluble polymer compound and the mixture of the monomers may be each added separately or added in a form of a monomer dispersant which is obtained by mixing the alcoholic hydroxyl group-containing water-soluble polymer compound, the mixture of the monomers, and water. In a case of adding the alcoholic hydroxyl group-containing water-soluble polymer compound and the monomers separately, it is desirable to start adding both substantially at the same time. Aggregates are easily generated when a large amount of only the mixture of the monomers is added first and, in contrast, when a large amount of only the alcoholic hydroxyl group-containing water-soluble polymer compound is added first, problems easily occur such as that the viscosity of polymerization-base is thickened, or that aggregates are easily generated. It is not necessary to finish adding both at the same time; however, it is preferably substantially at the same time.

Among the methods for adding the alcoholic hydroxyl group-containing water-soluble polymer compound and the mixture of the monomers, a method of mixing the alcoholic hydroxyl group-containing water-soluble polymer compound with the mixture of the monomers and water and dispersing and adding the resultant into a reaction container after initiating the polymerization is preferable since the sequence distribution of the ethylenically unsaturated monomer in a polymer chain of the alkali-soluble copolymer is even.

It is possible to produce the alkali-soluble copolymer which is used in the production of the pH adjusted resin by polymerizing (preferably emulsion polymerizing) ethylenically unsaturated carboxylic acid monomers and other monomers which are able to be copolymerized therewith in the presence of a copolymerizable surfactant.

The copolymerizable surfactant which is used in the production of the alkali-soluble copolymer is a surfactant which has one or more polymerizable vinyl groups in the molecules thereof. Specific examples thereof include anionic polymerizable surfactants such as propenyl-2-ethylhexyl sodium sulfosuccinate ester, (meth)acrylic acid polyoxyethylene sulfuric acid ester, polyoxyethylene alkyl propenyl ether sulfate ester ammonium salt, and (meth)acrylic acid polyoxyethylene ester phosphate ester; non-ionic polymerizable surfactants such as polyoxyethylene alkylbenzene ether (meth)acrylic acid esters, and polyoxyethylene alkyl ether (meth)acrylic acid ester; and the like. Among the copolymerizable surfactants, polyoxy ethylene alkyl propenyl ether ammonium sulfate salt is suitable since the balance of the emulsion dispersion performance of monomers and the copolymerization property of the monomers is excellent.

The amount of the copolymerizable surfactant is generally 0.01 parts by mass to 5.0 parts by mass with respect to the total monomers 100 parts by mass which are used in synthesizing the alkali-soluble copolymer, preferably 0.05 parts by mass to 5.0 parts by mass, and more preferably 0.1 parts by mass to 3.0 parts by mass. Since the emulsion stability is low when the amount of the copolymerizable surfactant is less than 0.01 parts by mass, a large number of aggregates may be generated at the time of polymerization. In contrast, when the amount of the copolymerizable surfactant exceeds 5.0 parts by mass, there may be a problem in that the pH adjusted resin composition is easily foamed. Here, in the polymerization of the alkali-soluble copolymer, a non-polymerizable surfactant is preferably not used therewith; however, in a case of using a non-polymerizable surfactant, the amount of the non-polymerizable surfactant is generally less than 0.05 parts by mass with respect to 100 parts by mass of the total monomers which are used in the synthesis of the alkali-soluble copolymer. When the amount of the non-polymerizable surfactant is large, there is a tendency for the water resistance of the obtained image to be poor.

The polymerization initiators which are able to be used in the production of the alkali-soluble copolymer are not particularly limited. Specific examples thereof include inorganic peroxides such as sodium persulfate, potassium persulfate, ammonium persulfate, potassium phosphate, and hydrogen peroxide; organic peroxides such as diisopropylbenzene hydroperoxide, cumene hydroperoxide, t-butyl hydroperoxide, 1,1,3,3-tetra-methyl-butyl hydroperoxide, di-t-butyl peroxide, isobutyryl peroxide, and pen benzoyl peroxide; azo compounds such as azobisisobutyronitrile, azobis-2,4-dimethyl valeronitrile, azobis methyl isobutyrate, and the like. It is possible to use the polymerization initiators each individually or in a combination of two or more types. Among these, persulfates such as potassium persulfate and ammonium persulfate are preferable.

The usage amount of the polymerization initiator varies according to the type thereof but is preferably 0.5 parts by mass to 5 parts by mass with respect to the 100 parts by mass of the total monomer mixture which is used in producing the water dispersing liquid of the alkali-soluble copolymer, and more preferably 0.8 parts by mass to 4 parts by mass. In addition, it is also possible to use the polymer initiators in combination with a reducing agent as a redox-based polymerization initiator.

The reducing agent of the redox-based polymerization initiator is not particularly limited and specific examples thereof include a compound which contains metallic ions in a reduced state such as ferrous sulfate or copper (1) naphthenate; sulfonic acid compounds such as methane sodium sulfonate; amine compounds such as dimethyl aniline; and the like.

It is possible to use the reducing agent individually or in a combination of two or more types. The usage amount of the reducing agent varies according to the reducing agent but is preferably 0.03 parts by mass to 10 parts by mass with respect to 1 part by mass of the polymerization initiator.

In order to adjust the mass average molecular weight of the alkali-soluble copolymer, it is possible to use a chain transfer agent at the time of polymerization as necessary. Examples of the chain transfer agent include mercaptans such as t-dodecyl mercaptan, and n-dodecyl mercaptan; α-methyl styrene dimer; sulfides such as dimethyl xanthogen disulfide, and diisopropyl xanthogen disulfide; nitrile compounds such as 2-methyl-3-butyronitrile, and 3-pentenenitrile; thioglycolic acid esters such as thioglycolic acid methyl, thioglycolic acid propyl, and thioglycolic acid octyl; β-mercaptopropionic acid esters such as β-mercaptopropionic acid methyl, and β-mercaptopropionic acid octyl, and the above can be used alone or in a combination of two or more. Among the chain transfer agents, thioglycolic acid ester is preferable and thioglycolic acid octyl is more preferable.

In a case of using a chain transfer agent, the added amount thereof is generally 0.1 parts by mass to 5 parts by mass with respect to 100 parts by mass of the monomers which are used in producing the alkali-soluble copolymer, and preferably 0.5 parts by mass to 4 parts by mass. The viscosity after being neutralized may be high and handling may be difficult when the usage amount of the chain transfer agent is excessively small and, additionally, the molecular weight may be remarkably decreased when the usage amount is excessively large. The method for adding the chain transfer agent is not particularly limited and the total amount may be added in a batch, or small amounts may be added to the polymerization-base intermittently or continuously.

The polymerization temperature when producing the alkali-soluble copolymer is generally 0° C. to 100° C., and preferably 30° C. to 90° C. The polymerization conversion ratio is generally 90 mass % or more and preferably 95 mass % or more.

The degree of neutralization (the mol equivalent of an inorganic base with respect to the mol equivalent of an ethylenically unsaturated carboxylic acid monomer) in the neutralized matter of the alkali-soluble copolymer which is used in the invention is not particularly limited; however, the degree of neutralization thereof is generally 70% or more and preferably 95% or more.

The inorganic base which is used for neutralizing the alkali-soluble copolymer is not particularly limited; however, examples thereof include hydroxides of alkali metal such as sodium hydroxide and potassium hydroxide; and hydroxides of alkaline earth metals such as calcium hydroxide and magnesium hydroxide, and it is possible to use these individually or in a combination of two or more types. Among the inorganic bases, sodium hydroxide is favorable. It is possible to use ammonia as the inorganic base; however, it may cause decreases in the stability over time (for example, a decrease in pH) and discharge stability of the ink.

As the alkali-soluble copolymer which is used in the invention, among the alkali-soluble copolymers described above, an alkali-soluble copolymer which is obtained by polymerization in the presence of an alcoholic hydroxyl group-containing water-soluble polymer compound is preferable in terms of the viscosity not being easily changed when storing a pH adjusted resin composition for a long period and the dot reproducibility being superior.

The mass average molecular weight of the pH adjusted resin which is used in the invention is not particularly limited; however, in a case where the mass average molecular weight is excessively large (for example, in a case of exceeding 50,000), the viscosity of the pH adjusted resin emulsion may be high and handling thereof may be difficult. On the other hand, when the mass average molecular weight is excessively low (for example, less than 8,000), the scratch resistance may deteriorate. The mass average molecular weight of the pH adjusted resin is, for example, preferably 8,000 or more, more preferably 9,000 to 100,000, and even more preferably 10,000 to 50,000.

The glass transition temperature of the pH adjusted resin which is used in the invention is able to be arbitrarily set, but is preferably 5° C. to 50° C. and more preferably 20° C. to 40° C. When the glass transition temperature of the pH adjusted resin is within these ranges, an image which is excellent in bending resistance and also blocking resistance is obtained. Here, even when the glass transition temperature of the pH adjusted resin which is used in the invention is slightly high, the film-forming temperature of the ink composition of the invention is generally maintained to be low.

The solid content concentration of the pH adjusted resin which is used in the first to fourth black ink compositions which form the ink set according to the present embodiment is able to be 10 mass % or less with respect to the total mass of each of the black ink compositions, preferably 0.1 mass % to 8 mass %, more preferably 0.3 mass % to 6 mass %, and the resin emulsion is generally used in a state of water-based emulsion.

Regarding the pH adjusted resin emulsion which is used in the invention, the pH is preferably 8 to 11 and the pH is more preferably 9 to 11. Problems may occur in the discharge stability when the pH is less than 8 and in the dispersion stability when the pH exceeds 11.

The usage amount of the alkali-soluble copolymer in the pH adjusted resin which is used in the invention is preferably 2 parts by mass to 200 parts by mass with respect to a coloring agent 100 parts by mass, more preferably 5 parts by mass to 150 parts by mass, and particularly preferably 10 parts by mass to 100 parts by mass.

Regarding the first to fourth black ink compositions which form the ink set according to the present embodiment, it is possible to use polyalkylene-type emulsion as the fine particle emulsion as described above.

In the first to fourth black ink compositions which form the ink set according to the present embodiment, the solid content of the polyalkylene-type emulsion is able to be 10 mass % or less with respect to the total mass of the black ink composition and is preferably 0.5 mass % to 8 mass %, and more preferably 1 mass % to 5 mass %.

The first to fourth black ink compositions which form the ink set according to the present embodiment preferably include an emulsion which has the pH adjusted resin as a resin component and/or the polyalkylene-type emulsion, and more preferably include both an emulsion which has the pH adjusted resin as a resin component and the polyalkylene-type emulsion. The total content of the solid content of the pH adjusted resin and the polyalkylene-type emulsion is preferably 0.5 mass % to 20 mass % with respect to the total mass of the black ink composition.

In addition, the first to fourth black ink compositions which form the ink set according to the present embodiment may contain other resin components depending on the case. "Other resin components" has a meaning of resin components which are generally used in the production of black ink compositions and examples thereof include resin-based dispersing agents such as acryl-based resin such as polyvinyl alcohols, polyvinyl pyrrolidones, polyacrylic acid, acrylic acid-acrylonitrile copolymers, acrylic acid potassium-acrylonitrile copolymers, vinyl acetate-acrylic acid ester copolymers, and acrylic acid-acrylic acid ester copolymers; styrene-acryl resin such as styrene-acrylic acid copolymers, styrene-methacrylic acid copolymers, styrene-methacrylic acid-acrylic acid ester copolymers, styrene-α-methyl styrene-acrylic acid copolymers, and styrene-α-methyl styrene-acrylic acid-acrylic acid ester copolymers; styrene-maleic acid copolymers, styrene-maleic anhydride copolymers, vinyl naphthalene-acrylic acid copolymers, vinyl naphthalene-maleic acid copolymers, vinyl acetate-based copolymers such as vinyl acetate-ethylene copolymers, vinyl acetate-fatty acid vinyl ethylene copolymers, vinyl acetate-maleic acid ester copolymers, vinyl acetate-crotonic acid copolymers, and vinyl acetate-acrylic acid copolymers, and salts thereof, and resin-based surfactants, for example, polyoxyethylene alkyl ether, polyoxyethylene alkyl ester, polyoxyethylene sorbitan fatty acid ester, polyoxyethylene alkyl phenyl ether, polyoxyethylene alkyl amine, polyoxyethylene alkyl amide, and the like.

In a case where a black and white monochrome image is recorded using the ink set according to the present embodiment, the bronzing generation region shown in FIGURE is recorded using at least two types of black ink compositions with different carbon black amounts and resin component amounts, that is, at least two types of black ink compositions out of the first to third black ink compositions (K1 to K3). For this reason, when the ink set according to the present embodiment is used, not only is graininess suppressed and the gradation improved, but it is also possible to appropriately adjust the amount of the resin which is attached in the bronzing generation region when carrying out recording at the same time as stabilizing the discharge. For this reason, using the ink set according to the present embodiment, not only is graininess suppressed, but a favorable image where bronzing is improved is obtained and it is possible to provide an ink set which is excellent in discharge stability.

1.4. Other Components

The first to fourth black ink compositions which form the ink set according to the present embodiment may contain a coloring agent, an organic solvent, a resin, a surfactant, a pH adjusting agent, a preservative agent, an antifungal agent, a rust preventive agent, a chelating agent, and the like other than the components described above.

1.4.1. Coloring Agent

The first to fourth black ink compositions which form the ink set according to the present embodiment are also able to contain a complementary coloring agent in order to achromatize the coloring property (a reddening property in a dark color portion or, in particular, a yellowing property in a weak color portion) which is intrinsic to carbon black. "Complementary coloring agent" has the meaning of a coloring agent which is contained in the black ink composition in order to obtain an achromatic color image by reducing or removing color which is generated in a recorded image by the black ink and examples thereof include color index pigment blue 60 (C.I. PB 60), color index pigment blue 15:3, color index pigment blue 15:4, and the like.

Pigment blue 60 is preferably used for a black ink composition where the content of carbon black is 0.01 mass % to 1 mass % and the content thereof is not particularly limited; however, the amount is preferably 0.01 mass % to 0.5 mass % with respect to the total mass of the black ink composition. In addition, pigment blue 15:3 and pigment blue 15:4 are preferably used for a black ink composition where the content of carbon black is 1 mass % to 10 mass % and the content thereof is also not limited; however, for example, the amount is preferably 0.1 mass % to 5 mass % with respect to the total mass of the black ink composition.

1.4.2. Dispersing Agent

In the first to fourth black ink compositions which form the ink set according to the present embodiment, carbon black is preferably added to the ink composition, for example, as a pigment dispersion liquid which is dispersed in a water-based medium by a dispersing agent. It is possible to use a dispersing agent which is generally used for preparing a pigment dispersion liquid, for example, a polymer dispersing agent or a surfactant as the dispersing agent which is used for preparing the pigment dispersion liquid.

The amount of the dispersing agent is not particularly limited, but is preferably in a range of 0.01 mass % to 10 mass %, more preferably 0.1 mass % to 5 mass %. It is not possible to sufficiently obtain the dispersing agent effect when the content of the dispersing agent is less than 0.01 mass %, while, when the content of the dispersing agent exceeds 10 mass %, it is recognized to cause discharge defects due to crystal deposition, liquid crystal formation, decreases in the stability of the pigment, or the like.

As the dispersing agent, it is possible to favorably use a dispersing agent which is commonly used for preparing a pigment dispersion liquid other than a commonly used surfactant, for example, a polymer dispersing agent. Here, it is clear to a person skilled in the art that the dispersing agent which is included in the pigment dispersion liquid may function as a black ink composition dispersing agent and a surfactant.

It is possible to use a polymer dispersing agent, particularly, a resin dispersing agent, as a more preferable dispersing agent. Examples of preferable polymer dispersing agents include natural polymers. Specific examples thereof include proteins such as glue, gelatin, casein, or albumin, natural gums such as gum arabic or gum tragacanth, glucosides such as saponin, alginic acid, or alginic acid derivatives such as alginic acid propylene glycol ester, alginic acid triethanol amine, or ammonium alginate, and cellulose derivatives such as methyl cellulose, carboxymethyl cellulose, hydroxyethyl cellulose, or ethyl hydroxycellulose.

In addition, preferable examples of polymer dispersing agents also include synthesized polymers. Specific examples include acrylic resins such as polyvinyl alcohols, polyvinyl pyrrolidones, polyacrylic acid, acrylic acid-acrylonitrile copolymers, acrylate-acrylonitrile copolymers, vinyl acetate-acrylic acid ester copolymers, or acrylic acid-acrylic acid ester copolymers; styrene-acrylic resins such as styrene-acrylic acid copolymers, styrene-methacrylic acid copolymers, styrene-methacrylic acid-acrylic acid ester copolymers, styrene-α-methyl styrene-acrylic acid copolymers, or styrene-α-methyl styrene-acrylic acid-acrylic acid ester copolymers; vinyl acrylate copolymers such as styrene-maleic acid copolymers, styrene-maleic anhydride copolymers, isobutylene-maleic acid resins, rosin-modified maleic acid resins, vinyl naphthalene-acrylic acid copolymers, vinylnaphthalene-maleic acid copolymers, alternatively, vinyl acetate-ethylene copolymers, vinyl acetate-fatty acid vinyl ethylene copolymers, vinyl acetate-maleic acid ester copolymers, vinyl acetate-crotonic acid copolymers, or vinyl acetate-acrylic acid copolymers, and salts thereof. Among these, styrene-acrylic acid copolymers, styrene-methacrylic acid copolymers, acrylic acid-acrylic acid ester copolymers, and styrene-maleic anhydride copolymers are preferable as the dispersing agent.

In addition, it is possible to use commercially available resin dispersing agents and specific examples thereof include JONCRYL 68 (molecular weight 10,000, acid value 195), JONCRYL 61J (molecular weight 10,000, acid value 195), JONCRYL 680 (molecular weight 3,900, acid value 215), JONCRYL 682 (molecular weight 1,600, acid value 235), JONCRYL 550 (molecular weight 7,500, acid value 200), JONCRYL 555 (molecular weight 5,000, acid value 200), JONCRYL 586 (molecular weight 3,100, acid value 105), JONCRYL 683 (molecular weight 7,300, acid value 150), JONCRYL B-36 (molecular weight 6,800, acid value 250), and the like produced by Johnson Polymer Ltd.

1.4.3. Surfactant

The first to fourth black ink compositions which form the ink set according to the present embodiment are able to contain a surfactant. Specific examples of surfactants include anionic surfactants (for example, sodium dodecyl benzene sulfonic acid, sodium lauryl acid, or an ammonium salt of polyoxyethylene alkyl ether sulfate), nonionic surfactants (for example, polyoxyethylene alkyl ether, polyoxyethylene alkyl esters, polyoxyethylene sorbitan fatty acid esters, polyoxyethylene alkyl phenyl ethers, polyoxyethylene alkyl amines, or polyoxyethylene alkylamide), amphoteric surfactants (for example, N,N-dimethyl-N-alkyl-N-carboxymethyl ammonium betaine, N,N-dialkylaminoalkylene carboxylate, N,N,N-trialkyl-N-sulfoalkylene ammonium betaine, N,N-dialkyl-N,N-bis polyoxyethylene ammonium sulfate betaine ester, or 2-alkyl-1-carboxymethyl-1-hydroxyethyl imidazolinium betaine), and these may be used alone or in a combination of two types or more thereof.

An acetylene glycol-based surfactant is preferably used as the surfactant. It is possible to improve permeability of the black ink composition to a recording medium by the addition of the surfactant and it is possible to expect recording with less bleeding with various types of recording media. Preferable specific examples of an acetylene glycol-based surfactant which is used in the black ink composition which is used in the invention include compounds which are represented by General Formula (1):

(in the formula, 0≤m+n≤50, $R^1$, $R^2$, $R^3$, and $R^4$ are each independently an alkyl group, and preferably an alkyl group with 6 or less carbon atoms).

Among the compounds which are represented by General Formula (1), particularly preferable examples include 2,4,7,9-tetramethyl-5-decyne-4,7-diol, 3,6-dimethyl-4-octyne-3,6-diol, 3,5-dimethyl-1-hexyne-3 ol, and the like. It is also possible to use commercially available products as the acetylene glycol-based surfactant which is represented by General Formula (1) and specific examples thereof include SURFYNOL 104, 82, 465, 485, or TG (all of these are available from Air Products and Chemicals. Inc.), and OLFIN STG and OLFIN E1010 (all of these are product names produced by Nissin Chemical Co., Ltd.).

In addition, as a surfactant, it is preferable to include a silicone-based surfactant which is represented by General Formula (2):

(in the formula, $R^{11}$ to $R^{17}$ independently represent C1 to 6 alkyl groups, j and k are independently represent an integer of 1 or more, EO represents an ethylenoxy group, PO represents a propyleneoxy group, and s and t represent an integer of 0 or more; however, here, s+t represents an integer of 1 or more and BO and PO may be random or blocks regardless of the order in the square brackets [ ]). By the addition thereof, it is possible to improve permeability of the black ink composition to a recording medium.

A preferable compound in the silicone-based surfactant which is represented by General Formula (2) is a compound where, in General Formula (2), $R^{11}$ to $R^{17}$ are independently a C1 to 6 alkyl group, more preferably a methyl group, j and k independently an integer of 1 or more, more preferably 1 or 2, and s and t represent an integer of 0 or more; however, here, s+t is an integer of 1 or more, more preferably s+t is 2 to 4.

A particularly preferable compound in the silicone-based surfactant which is represented by General Formula (2) is a compound where j and k in General Formula (2) are the same number, moreover 1 to 3, particularly 1 or 2, a more preferable compound which is represented by General Formula (2) is a compound where $R^{11}$ to $R^{17}$ all represent a methyl group, j represents 1, k represents 1, u represents 1, s represents an integer of 1 or more, particularly an integer of 1 to 5, and t represents 0.

The adding amount of the silicone-based surfactant which is represented by General Formula (2) may be appropriately determined; however, 0.03 mass % to 3 mass % is preferable with respect to the total mass of the black ink composition which is used in the invention, approximately 0.1 mass % to 2 mass % is more preferable, and approximately 0.3 mass % to 1 mass % is even more preferable.

The silicone-based surfactant which is represented by General Formula (2) is commercially available and it is possible to use such commercial products. For example, it is possible to use silicone-based surfactants BYK-347 or BYK-348 which are commercially available from BYK Additives and Instruments.

The amount of the surfactant which is contained in each of the black ink compositions is not particularly limited, but is preferably in a range of 0.01 mass % to 10 mass %, and more preferably 0.1 mass % to 5 mass %. It is not possible to sufficiently obtain the surfactant effect when the content of the surfactant is less than 0.01 mass %, while, when the content of the surfactant exceeds 10 mass %, it is recognized to cause discharge defects due to crystal deposition, liquid crystal formation, decreases in the stability of the pigment, or the like.

1.4.4. Water-Soluble Organic Solvent

The first to fourth black ink compositions which form the ink set according to the present embodiment are able to further contain a water-soluble organic solvent as a wetting agent, a drying speed adjusting agent, and/or a stabilizer. The content of the water-soluble organic solvent which is added to each of the black ink compositions is preferably 0.5 mass % to 40 mass % with respect to the total mass of the black ink composition, and more preferably 2 mass % to 30 mass %.

As the water-soluble organic solvent, it is possible to use a water-soluble organic solvent blended in a conventional aqueous pigment ink composition, and specific examples thereof include polyhydric alcohols such as ethylene glycol, diethylene glycol, triethylene glycol, tetraethylene glycol, polyethylene glycol, polypropylene glycol, propylene glycol, dipropylene glycol, butylene glycol, 1,2,6-hexanetriol, thio glycol, hexylene glycol, glycerin, trimethylolethane, or trimethylol propane; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, or triethylene glycol monobutyl ether; or 2-pyrrolidone, N-methyl-2-pyrrolidone, 1,3-dimethyl-2-imidazolidinone, or triethanol amine.

1.4.5. Preservative Agent

In addition, the first to fourth black ink compositions which form the ink set according to the present embodiment preferably further contain a preservative agent. Here, the preservative agent is preferably one or more types of compounds selected from a group consisting of alkylisothiazolone, chloralkylisothiazolone, benzisothiazolone, bromonitroalcohol, oxazolidine-based compounds, and chloroxylenol.

1.4.6. Metallic Ion Trapping Agent

The first to fourth black ink compositions which form the ink set according to the present embodiment preferably further contain a metallic ion trapping agent. Here, the metallic ion trapping agent is preferably ethylenediamine tetraacetate.

1.4.7. Rust Preventive Agent

The first to fourth black ink compositions which form the ink set according to the present embodiment preferably further contain a rust preventive agent. Here, for the rust preventive agent, dicyclohexyl ammonium nitrate and/or benzotriazole are preferably used.

1.4.8. Dissolution Assisting Agent

Furthermore, regarding the first to fourth black ink compositions which form the ink set according to the present embodiment, it is possible to appropriately select and use alkyl alcohols with 1 to 4 carbon atoms such as ethanol, methanol, butanol, propanol, or isopropanol, formamide, acetamide, dimethylsulfoxide, sorbit, sorbitan, acetine, diacetine, triacetine, sulfolane, and the like as components which improve the solubility of the ink components and further improve permeability with respect to a recording medium, for example, paper, or prevent nozzles from clogging.

1.4.9. pH Adjusting Agent

Furthermore, the first to fourth black ink compositions which form the ink set according to the present embodiment preferably contain a tertiary amine as a pH adjusting agent. Examples of the tertiary amine include trimethyl amine, triethyl amine, triethanol amine, dimethyl ethanol amine, diethylethanol amine, triisopropenol amine, butyl diethanol amine, and the like. These may be used individually or may be used together. The adding amount of the tertiary amine to each of the black ink compositions is preferably 0.1 mass % to 10 mass %, and more preferably 0.5 mass % to 5 mass %.

1.4.10. Permeation Promoting Agent

It is also possible to make the first to fourth black ink compositions which form the ink set according to the present embodiment contain a permeation promoting agent. Examples of the permeation promoting agent include alkyl ether derivatives having 3 or more carbon atoms of polyhydric alcohol, for example, diethylene glycol monobutyl ether, triethylene glycol monobutyl ether, propylene glycol monobutyl ether, dipropylene glycol monobutyl ether, and the like, and these may be used alone or as two or more types thereof.

1.4.11. Sugar

In addition, it is also possible for the first to fourth black ink compositions which form the ink set according to the present embodiment to contain sugar. Example of sugars include monosaccharides, disaccharide, oligosaccharides (including trisaccharides and tetrasaccharides), and polysaccharides, preferably glucose, mannose, fructose, ribose, xylose, arabinose, galactose, aldonic acid, glucitol, (sorbitol), maltose, cellobiose, lactose, sucrose, trehalose, maltotriose, and the like. Here, polysaccharide has the meaning of sugar in a broad sense and is used with a meaning which includes substances which are widely present in nature such as alginic acid, α-cyclodextrin, and cellulose. In addition, examples of derivatives of these saccharides include reduced sugars of the saccharides (for example, sugar alcohol (which is represented by General Formula $HOCH_2(CHOH)nCH_2OH$ (here, n represents an integer of 2 to 5)), sugar oxides (for example, aldonic acid, uronic acid, and the like), amino acid, thiosugar, and the like. Sugar alcohols are particularly preferable and specific examples thereof include multitol, sorbit, and the like. In addition, it is possible to use HS-500 or HS-300 (produced by Hayashibara Co., Ltd.) and the like as commercially available products. The adding amount of the saccharides is preferably approximately 0.1 mass % to 40 mass %, and more preferably approximately 1 mass % to 30 mass %.

1.4.12. Alginic Acid Derivative

In addition, it is also possible for the first to fourth black ink compositions which form the ink set according to the present embodiment to contain an alginic acid derivative. Preferable examples of alginic acid derivatives include alginic acid alkali metal salts (for example, sodium salt and potassium salt), alginic acid organic salts (for example, triethanol amine salt), alginic acid ammonium salts, and the like. The adding amount of the alginic acid derivative to the black ink composition is preferably approximately 0.01 mass % to 1 mass %, and more preferably approximately 0.05 mass % to 0.5 mass %.

The reason why it is possible to obtain a favorable image by adding an alginic acid derivative is not clear; however, it is considered to be due to a multivalent metal salt which is present in a reaction liquid reacting with the alginic acid derivative in the black ink composition and changing the dispersing state of a coloring agent and promoting the fastness of the coloring agent to a recording medium.

1.4.13. Other

Apart from these, it is also possible for the first to fourth black ink compositions which form the ink set according to the present embodiment to contain amines such as propanol amine and morpholine and modified products thereof, inorganic hydroxides such as potassium hydroxide, sodium hydroxide, and lithium hydroxide, carbonates such as ammonium hydroxide, quaternary ammonium salts (tetramethyl ammonium and the like), potassium carbonate, sodium carbonate, and lithium carbonate, as well as, phosphates, and the like.

It is also possible to use ureas such as urea, thiourea, and tetramethylurea, allophanates such as allophanate and methylallophanate, biurets such as biuret, dimethylbiuret, and tetramethylbiuret, L-ascorbic acid and salts thereof, commercially available antioxidants, ultraviolet absorbers, and the like as other additive agents.

1.5. Method for Preparing Black Ink Composition

It is possible to produce the first to fourth black ink compositions which form the ink set according to the present embodiment, for example, by dispersing and mixing each of the components with an appropriate method. Preferably, firstly, a pigment, a polymer dispersing agent, and ion-exchanged water are mixed in an appropriate dispersing apparatus (for example, a ball mill, a sand mill, an Attritor, a roll mill, an agitator mill, a HENSCHEL MIXER, a colloid mill, an ultrasonic homogenizer, a jet mill, an ANGMILL, and the like), and a uniform pigment dispersing liquid is prepared.

Subsequently, an ink solvent is prepared by sufficiently stirring the fine particle emulsion (in particular, pH adjusted resin emulsion and polyalkylene-type emulsion), ion-exchanged water, a water-soluble organic solvent, a preservative agent, and/or an antifungal agent, and the like at normal temperature. The pigment dispersing liquid is sufficiently stirred by being gradually dripped into a state where the ink solvent is stirred in an appropriate dispersing apparatus. After sufficiently stirring, it is possible to obtain a target black ink composition by performing filtration in order to remove rough particles and foreign matter which are a cause of clogging. Here, it is possible to use commercially available polyalkylene-type emulsions. For example, it is possible to use AQ593, AQ513, or PEM-17 which are commercially available from BYK Additives and Instruments.

1.6. Physical Properties

Regarding the first to fourth black ink compositions which form the ink set according to the present embodiment, the surface tension is preferably 45 mN/m or less, and more preferably in a range of 25 mN/m to 45 mN/m. When the surface tension exceeds 45 mN/m, a favorable recorded image is not easily obtained since the dryness of the printing is poor, bleeding is easily generated, color bleeding is generated, and the like. In addition, when the surface tension is less than 25 mN/m, problems are easily generated in discharge stability such as flight curvature being generated in the ink droplets or the like since the nozzle surroundings of the printer head are easily wet. It is possible to measure the surface tension described above by a surface tensiometer which is generally used.

It is possible to set the surface tension of ink within the ranges described above by adjusting the type, composition ratio, or the like of each of the components which configure the ink.

1.7. Use

The ink set according to the present embodiment is an ink set for monochrome recording by the first to fourth black ink compositions; however, it is possible for the ink set according to the present embodiment to be an ink set for color recording by combining with other ink compositions.

Including the first to fourth black ink compositions which form the ink set according to the present embodiment, each of the black ink compositions may include an appropriate complementary coloring agent as desired or include a color ink composition which is able to print complementary colors, for example, a combination of light magenta and light cyan, a combination of light magenta, light cyan, and yellow, and the like.

In addition, the type or number of the ink compositions which form the ink set according to the present embodiment is not particularly limited as long as the first to fourth black ink compositions of the invention are included; however, further examples thereof include an ink set which includes a yellow ink composition, a cyan ink composition, and a magenta ink composition; an ink set to which a light cyan ink composition and a light magenta ink composition are added; an ink set to which a dark yellow ink composition is added; an ink set to which a red ink composition, a green ink composition, and a blue ink composition are added; an ink set to which an orange ink composition, a green ink composition, and a blue ink composition are added; and an ink set to which an orange ink composition, a green ink composition, and a violet ink composition are added.

Here, each of the ink compositions of "light magenta" and "light cyan" are generally ink compositions where the coloring material concentrations of each of a magenta ink composition and a cyan ink composition are lowered for the purpose of improving the image quality of a recorded image due to the change in concentration. In addition, a "dark yellow" ink composition is a yellow ink composition which uses a coloring material (pigment) which has lower brightness and saturation than a yellow ink composition for the purpose of improving the color reproducibility with respect to dark colors such as a shadow portions. Then, each of the "red", "orange", "green", "blue", and "violet" ink compositions are ink compositions which are used as elements which form intermediate colors of yellow, magenta, and cyan in order to improve the color reproducing range.

It is possible to form the ink set of the invention in the same manner as an ink set which is known in the art apart from including the first to fourth black ink compositions of the invention, and it is possible to use the ink set of the invention as ink for various types of recording methods which are known in the art. The ink set is preferably aqueous and, in particular, an ink set for ink jet recording.

In addition, it is possible to favorably use an ink cartridge (a storage case) which stores an ink set which is known in the art.

2. Recording Method

The recording method according to the present embodiment is a recording method which performs recording by discharging droplets of the ink composition and attaching the droplets to a recording medium, and which uses the ink set according to the present embodiment described above. Here, it is possible to favorably perform the recording method by mounting an ink cartridge (ink cartridge in which each of the black ink compositions is individually stored) in which the ink set of the invention is stored on an ink jet recording apparatus which is known in the art and carrying out recording on a recording medium.

Here, the ink jet recording apparatus is preferably an ink jet recording apparatus on which electrostrictive elements which are able to vibrate based on electric signals are mounted and which is configured so as to be able to discharge ink included in the ink set according to the invention by vibration of the electrostrictive elements.

In addition, since an image which is obtained by the recording method according to the present embodiment is recorded using the ink set according to the present embodiment, the graininess of the obtained image is favorable and bronzing is improved more than with the techniques known in the art.

It is possible to use the ink set of the invention for an arbitrary recording method and, for example, favorable use is possible as aqueous gravure ink, aqueous flexographic ink, or particularly aqueous ink for ink jet recording. In addition, it is also possible to use the ink set of the invention as aqueous paint.

As a recording medium, it is particularly preferable to use a recording medium where resin components of the coloring agent (particularly, the pigments) and fine particle emulsion (particularly, the pH adjusted resin and polyalkylene-type emulsion) which are included in each of the black ink compositions substantially remain on the surface while the liquid components of each of the black ink compositions are substantially absorbed. Regarding the recording medium, for example, the average pore diameter of the surface is smaller than the average particle diameter of the pigment. A preferable recording medium is a recording medium which includes an ink receiving layer which has a smaller average pore diameter than the average particle diameter of the pigment.

It is possible to use a recording medium which is provided with an ink receiving layer which contains a porous pigment on a base material as a preferable recording medium. The ink receiving layer is also able to be the uppermost layer of the recording medium or an intermediate layer which has, for example, a gloss layer thereon. As the recording medium, a so-called absorbing type (also called a gap type) recording medium which contains a porous pigment and a binder resin in the ink receiving layer and a so-called swelling type recording medium which further contains a resin such as casein, modified polyvinyl alcohol (PVA), gelatin, modified urethane, or the like in the ink receiving layer, are known and it is possible to use each of the black ink compositions described above with either recording medium.

Examples of the porous pigment which is contained in the ink receiving layer of an absorbing type recording medium include silica-based pigments such as a precipitation method, gel type, or a gas phase method, hydrated alumina such as pseudoboehmite, silica/alumina hybrid sol, smectite clay, calcium carbonate, calcium sulfate, barium sulfate, titanium dioxide, kaolin, white clay, talc, magnesium silicate, calcium silicate, and the like, and it is possible to use one type or two or more types thereof.

In addition, the binder resin which is contained in the ink receiving layer of the absorbing type recording medium is not particularly limited as long as the binder resin is a compound which has bonding abilities and is able to increase the strength of the ink receiving layer, and examples thereof include cellulose derivatives such as polyvinyl alcohol, silanol modified polyvinyl alcohol, vinyl acetate, starch, and carboxy methyl cellulose, conjugated diene-based copolymer latexes such as casein, gelatin, and styrene-butadiene copolymer, vinyl-based copolymer latexes such as ethylene-vinyl acetate copolymer, acryl-based copolymer latexes such as polymers of acrylic acid and methacrylic acid, and the like.

It is also possible for the ink receiving layer to contain various types of additive agents such as a fixing agent, a fluorescent brightening agent, a water resistant agent, an antifungal agent, a preservative agent, a dispersing agent, a surfactant, a viscosity thickening agent, a pH adjusting agent, an antifoaming agent, and/or moisturizer as necessary even in a case of an ink receiving layer of an absorbing type recording medium or in a case of an ink receiving layer of a swelling type recording medium.

Examples of the base material in which each ink receiving layer is provided include paper (including size processing paper); resin coating paper where polyethylene, polypropylene, polyester, or the like is coated on paper; BARYTA paper; thermoplastic resin films such as polyethylene terephthalate, polyethylene, or polypropylene; synthetic paper; matter in a sheet form which is formed of synthetic fibers, and the like.

A recording medium of a particularly preferable aspect is a recording medium which has the base material and the ink receiving layer which is provided thereon as the uppermost layer, and the base material and ink receiving layer also preferably have, for example, the physical properties below.

The base material is preferably paper (which contains wooden pulp) and the weight thereof is preferably 100 g/m$^2$ to 350 g/m$^2$, and more preferably 180 g/m$^2$ to 260 g/m$^2$. In addition, the thickness is preferably 100 μm to 400 μm, and more preferably 180 μm to 260 μm. The ink receiving layer preferably contains a wet-process silica gel at an amount of 50 mass % to 60 mass % as the porous pigment in solid content conversion based on the mass of the whole ink receiving layer and contains polyvinyl alcohol at an amount of 30 mass % to 40 mass % as the binder resin in terms of ink absorbance, printing fastness, and the like. In addition, the coating amount of the ink receiving layer is preferably 5 g/m$^2$ to 50 g/m$^2$ in solid content conversion in terms of ink absorbance. Here, the thickness of the ink receiving layer itself is preferably 10 μm to 40 μm, and more preferably 20 μm to 30 μm.

Regarding the recording medium which is used for the recording method of the invention, the average pore diameter of the surface (in particular, an ink receiving layer) of the recording medium is preferably 50 nm or less and more preferably 30 nm or less. When the average pore diameter exceeds 300 nm, the pigment permeates into the ink receiving layer and the coloring property may decrease.

Here, the first and second black ink compositions which form the ink set according to the present embodiment are not only able to be used as light black ink for printing a light gray region in combination with one type or more of other black ink compositions with different concentrations as described above in general, but are also able to be used as clear ink. Examples of cases of use as clear ink include uses for reducing variation in the coating amount of resin components in a recorded image, and the like.

As shown above, according to the ink set and recording method according to the present embodiment, it is possible to provide an ink set and recording method which are able to obtain a favorable image where graininess is favorable even in a bright gradation region and bronzing is improved by adjusting the solid content of resin components in the emulsion and the content of carbon black in the four types of black ink compositions which form the ink set. Furthermore, discharge stability of ink is also excellent by adjusting the solid content of resin components in the emulsion and the content of carbon black in each of the black ink compositions.

3. Examples

More detailed description will be given below of the invention with Examples and Comparative Examples; however, the invention is not limited to the examples. Here, unless otherwise stated, "parts" and "%" in the Examples and Comparative Examples are based on mass. In addition, the acid value of the copolymer which was obtained in the preparation examples below was measured according to JIS K 0070.

3.1. Preparation of Each Ink Set 3.1.1. Preparation of pH Adjusted Resin Emulsion 60 parts of methacrylic acid ethyl, 36 parts of methacrylic acid methyl, 4 parts of methacrylic acid, 3 parts of thioglycol acid octyl as a molecular weight adjusting agent, 1 part of polyvinyl alcohol, and 280 parts of ion-exchanged water are stirred and mixed and a dispersant of a monomer mixture was prepared.

130 parts of ion-exchanged water and 2 parts of potassium persulfate were added to another reaction container with a stirrer, the temperature was increased to 80° C., and a dispersant of the monomer mixture was continuously added and polymerized over 4 hours. After finishing the continuous addition, post-reaction was performed at 80° C. for 30 minutes. The polymerization conversion ratio was 99% or more.

Subsequently, a 10% sodium hydroxide water solution of an equivalent amount to sodium hydroxide at an equivalent mol to the added methacrylic acid was added to the reaction container, after further carrying out a heating treatment at 80° C. for one hour, an appropriate amount of ion-exchanged water was added, and the pH adjusted resin emulsion of solid content concentration 15% was obtained. The acid value of the pH adjusted resin emulsion was 30.

Next, regarding black ink compositions which form the 10 types of ink sets described in the Table below, each blending component was mixed and dispersed together with glass beads [diameter=1.7 mm; 1.5 times (mass) as the mixture] in a sand mill (manufactured by YASUKAWA Corp.) for two hours and 10 types of ink sets, that is, Examples 1 to 7 to Comparative Examples 1 to 3, were obtained.

Here, in the Table below, only the content of the solid content (mass %), the ratio thereof, and the evaluation results are described. That is, the Table describes the content (mass %) of carbon black (pigment solid content) which is a pigment, the content (mass %) of resin solid content, the ratio of resin solid content with respect to the pigment solid content, and the evaluation of graininess, bronzing, and discharge property.

As other ink components than the solid content described above, as a water-soluble resin, 0.1 mass % of a styrene-acrylic acid copolymer (molecular weight=15000; acid value=100), a solvent (HS500, produced by Hayashibara Co., Ltd.) which has sugar as a main component, glycerine, triethanol amine, 1,2-hexane diol, silicone-based surfactant (BYK 348, produced by BYK Additives and Instruments), a preservative agent (PROXEL GXL, produced by Avecia Co., Ltd.), and EDTA were added at appropriate amounts. Here, other than the above, pure water which makes the total 100 mass % is included in each ink.

TABLE

|  | Example 1 | | | | Example 2 | | | | Example 3 | | | | Comparative Example 1 | | | |
| --- | --- | --- | --- | --- | --- | --- | --- | --- | --- | --- | --- | --- | --- | --- | --- | --- |
|  | K1 | K2 | K3 | K4 | K1 | K2 | K3 | K4 | K1 | K2 | K3 | K4 | K1 | K2 | K3 | K4 |
| Pigment solid content | 0.25 | 0.35 | 0.8 | 2.5 | 0.25 | 0.35 | 0.8 | 2.5 | 0.25 | 0.35 | 0.8 | 2.5 | 0.25 | 0.35 | 0.8 | 2.5 |
| Resin solid content | 5.5 | 5.5 | 2.5 | 0.75 | 5.5 | 8 | 2.5 | 0.75 | 5.5 | 10 | 2.5 | 0.75 | 5.5 | 2.5 | 2.5 | 0.75 |
| Resin solid content/ Pigment solid content | 22.0 | 15.7 | 3.1 | 0.3 | 22.0 | 22.9 | 3.1 | 0.3 | 22.0 | 28.6 | 3.1 | 0.3 | 22.0 | 7.1 | 3.1 | 0.3 |
| Graininess and bronzing | A | | | | A | | | | A | | | | B | | | |
| Discharge property | A | | | | A | | | | B | | | | A | | | |

|  | Example 4 | | | | Example 5 | | | | Comparative Example 2 | | | |
| --- | --- | --- | --- | --- | --- | --- | --- | --- | --- | --- | --- | --- |
|  | K1 | K2 | K3 | K4 | K1 | K2 | K3 | K4 | K1 | K2 | K3 | K4 |
| Pigment solid content | 0.25 | 0.35 | 0.8 | 2.5 | 0.25 | 0.35 | 0.8 | 2.5 | 0.25 | 0.35 | 0.8 | 2.5 |
| Resin solid content | 10 | 5.5 | 2.5 | 0.75 | 15 | 5.5 | 2.5 | 0.75 | 2.5 | 5.5 | 2.5 | 0.75 |
| Resin solid content/ Pigment solid content | 40.0 | 15.7 | 3.1 | 0.3 | 60.0 | 15.7 | 3.1 | 0.3 | 10.0 | 15.7 | 3.1 | 0.3 |
| Graininess and bronzing | A | | | | A | | | | B | | | |
| Discharge property | A | | | | B | | | | A | | | |

|  | Example 6 | | | | Example 7 | | | | Comparative Example 3 | | | |
| --- | --- | --- | --- | --- | --- | --- | --- | --- | --- | --- | --- | --- |
|  | K1 | K2 | K3 | K4 | K1 | K2 | K3 | K4 | K1 | K2 | K3 | K4 |
| Pigment solid content | 0.25 | 0.35 | 0.8 | 2.5 | 0.25 | 0.35 | 0.8 | 2.5 | 0.25 | 0.35 | 0.8 | 2.5 |
| Resin solid content | 5.5 | 5.5 | 6 | 0.75 | 5.5 | 5.5 | 10 | 0.75 | 5.5 | 5.5 | 1 | 0.75 |

TABLE-continued

| Resin solid content/Pigment solid content | 22.0 | 15.7 | 7.5 | 0.3 | 22.0 | 15.7 | 12.5 | 0.3 | 22.0 | 15.7 | 1.3 | 0.3 |
|---|---|---|---|---|---|---|---|---|---|---|---|---|
| Graininess and bronzing | | A | | | | A | | | | B | | |
| Discharge property | | A | | | | B | | | | A | | |

3.1.2. Recording Method

Regarding the 10 types of ink sets which were prepared in 3.1.1., four types of ink compositions which form each of the ink sets were each filled in an ink chamber of a designated cartridge of ink jet printer (MC 2000; manufactured by Seiko Epson Corp.). Next, regarding each of the ink sets, respective gray gradation patterns (gray scale) from white to black were continuously output to a designated recording medium (MC photographic paper; manufactured by Seiko Epson Corp.) without dividing the gradation. The output was performed by distributing the discharging amount of each of the inks.

3.2. Evaluation Method 3.2.1. Evaluation of Bronzing

The obtained recorded matter was evaluated by five observers. The output recorded matter was positioned on a desk 1.5 m directly under fluorescent light which is the light of a room and the observers were made to stand beside the desk. The observers observed the printed matter from the right end to the left end of the printed matter from an upright state by moving their line of sight to various viewing angles without shielding the light. Here, in recorded matter where bronzing is generated, in a case of observing with a line of sight at a certain angle, the light of the fluorescent light appears to be strongly reflected as gold in the black output color in a range before and after gray level 140. Here, the generation of bronzing was evaluated based on the criteria below.

(Determination Criteria)

A: None of the observers observed bronzing.
B: At least one observer observed bronzing.

3.2.2. Evaluation of Graininess

The recorded matter which was obtained in the evaluation of the bronzing described above was visually observed and graininess was evaluated based on the criteria below.

(Determination Criteria)

A: Roughness is not visible in an image.
B: Roughness is visible in an image.

3.2.3. Evaluation of Discharge Property

After recording the recorded matter described above, a nozzle check pattern was printed. At this time, nozzle slip-out and flight curvature were visually observed and the discharge property was evaluated based on the discharge stability of each of the ink sets on the criteria below.

A: There is no nozzle slip-out and no flight curvature.
B: Nozzle slip-out and/or flight curvature are recognized.

3.3. Evaluation Results

The evaluation results below are as shown in the Table above. In the ink set according to Examples, by the pigment solid content and the resin solid content being contained at a predetermined ratio, a favorable image where graininess of the obtained image is reduced and bronzing was improved was obtained. In the Examples, Examples 3, 5, and 7 where the content ratio of the resin solid content with respect to the content of the pigment solid content is high, the results were that the discharge property was poor compared to other Examples. With respect to this, in Comparative Examples where the content ratio of the resin solid content with respect to the content of the pigment solid content was lower than the range of the invention, the discharge property was excellent but the graininess of the obtained image was poor and bronzing was also generated.

The invention is not limited to the embodiment described above and various types of modifications are possible. For example, the invention includes configurations which are substantially the same as the configurations which are described in embodiments (for example, configurations where the function, method, and results are the same or configurations where the purpose and effects are the same). In addition, the invention includes configurations where portions which are not fundamental to the configurations which are described in the embodiments are replaced. In addition, the invention includes configurations which exhibit the same operation and effects as the configurations which are described in the embodiment or configurations which are able to achieve the same purpose. In addition, the invention includes configurations where technology known in the art is added to the configurations which are described in the embodiments.

This application claims priority to Japanese Patent Application No. 2015-155869 filed on Aug. 6, 2015. The entire disclosure of Japanese Patent Application No. 2015-155869 is hereby incorporated herein by reference.

What is claimed is:

1. An ink set comprising:
  a first black ink composition which includes water, less than 0.3 mass % of carbon black, and 1 mass % to 10 mass % of an emulsion of a resin component;
  a second black ink composition which includes water, 0.3 mass % or more and less than 0.6 mass % of carbon black, and 2.5 mass % to 10 mass % of an emulsion of a resin component;
  a third black ink composition which includes water, 0.6 mass % or more and less than 1.5 mass % of carbon black, and 1.5 mass % to 5 mass % of an emulsion of a resin component, in which a solid content of the emulsion in the ink composition is twice or more a content of the carbon black; and
  a fourth black ink composition which includes water, 1.5 mass % to 10 mass % of carbon black, and 0.8 mass % to 5 mass % of an emulsion of a resin component.

2. The ink set according to claim 1, wherein the emulsion of the resin component which includes the first black ink composition to the fourth black ink composition includes a copolymer with an acid value of 40 or less obtained by polymerizing a polyalkylene-type emulsion and/or ethylenically unsaturated carboxylic acid monomers, and other monomers copolymerizable therewith, in a presence of an alcoholic hydroxyl group-containing water-soluble polymer compound or a copolymerizable surfactant, and an emulsion in which a pH adjusted resin of which the pH was adjusted with an inorganic salt is set as resin component.

3. The ink set according to claim 2, wherein an inorganic base which is used for the adjustment of the pH adjusted resin is an alkali metal hydroxide or an alkaline earth hydroxide.

4. The ink set according to claim 2, wherein the ethylenically unsaturated carboxylic acid monomer which is used for the adjustment of the pH adjusted resin is acrylic acid or methacrylic acid.

5. The ink set according to claim 2, wherein a monomer copolymerizable with the ethylenically unsaturated carboxylic acid monomer which is used for the adjustment of the pH adjusted resin is an ethylenically unsaturated carboxylic acid ester monomer.

6. The ink set according to claim 2, wherein a pH of the emulsion in which the pH adjusted resin is a resin component is 8 to 11.

7. The ink set according to claim 2, wherein the polyalkylene-type emulsion is a polyethylene-type emulsion or a polypropylene-type emulsion.

8. A recording method for performing recording by discharging droplets of an ink composition and attaching the droplets to a recording medium, the method comprising:
using the ink set according to claim 1.

9. A recording method for performing recording by discharging droplets of an ink composition and attaching the droplets to a recording medium, the method comprising:
using the ink set according to claim 2.

10. A recording method for performing recording by discharging droplets of an ink composition and attaching the droplets to a recording medium, the method comprising:
using the ink set according to claim 3.

11. A recording method for performing recording by discharging droplets of an ink composition and attaching the droplets to a recording medium, the method comprising:
using the ink set according to claim 4.

12. A recording method for performing recording by discharging droplets of an ink composition and attaching the droplets to a recording medium, the method comprising:
using the ink set according to claim 5.

13. A recording method for performing recording by discharging droplets of an ink composition and attaching the droplets to a recording medium, the method comprising:
using the ink set according to claim 6.

14. A recording method for performing recording by discharging droplets of an ink composition and attaching the droplets to a recording medium, the method comprising:
using the ink set according to claim 7.

* * * * *